United States Patent
Dunn et al.

(10) Patent No.: US 11,596,100 B2
(45) Date of Patent: Mar. 7, 2023

(54) DUAL SICKLE KNIFE DRIVE WITH VARIABLE PHASE ANGLE

(71) Applicant: MacDon Industries Ltd., Winnipeg (CA)

(72) Inventors: James Thomas Dunn, Winnipeg (CA); Bruce Robert Shearer, Winnipeg (CA)

(73) Assignee: MacDon Industries Ltd, Winnipeg (CA)

( * ) Notice: Subject to any disclaimer, the term of this patent is extended or adjusted under 35 U.S.C. 154(b) by 192 days.

(21) Appl. No.: 16/769,098

(22) PCT Filed: Jan. 17, 2019

(86) PCT No.: PCT/CA2019/050063
§ 371 (c)(1),
(2) Date: Jun. 2, 2020

(87) PCT Pub. No.: WO2019/169473
PCT Pub. Date: Sep. 12, 2019

(65) Prior Publication Data
US 2021/0137002 A1 May 13, 2021

Related U.S. Application Data

(60) Provisional application No. 62/638,580, filed on Mar. 5, 2018.

(51) Int. Cl.
*A01D 34/00* (2006.01)
*A01D 41/14* (2006.01)
*A01D 34/04* (2006.01)
*A01D 34/14* (2006.01)
*A01D 34/38* (2006.01)
*A01D 101/00* (2006.01)

(52) U.S. Cl.
CPC ........... *A01D 34/006* (2013.01); *A01D 34/38* (2013.01); *A01D 2101/00* (2013.01)

(58) Field of Classification Search
CPC .................. A01D 34/006; A01D 34/38; A01D 2101/00; A01D 34/14; A01D 34/135; A01D 34/30; A01D 34/00
See application file for complete search history.

(56) References Cited

U.S. PATENT DOCUMENTS

| | | | |
|---|---|---|---|
| 7,658,059 B2 * | 2/2010 | Majkrzak | A01D 34/38 56/264 |
| 10,412,890 B2 * | 9/2019 | Dunn | A01D 41/141 |
| 2015/0163995 A1 * | 6/2015 | Talbot | A01D 34/17 56/298 |
| 2019/0053426 A1 * | 2/2019 | Talbot | A01D 34/14 |
| 2021/0137002 A1 * | 5/2021 | Dunn | A01D 34/38 |

* cited by examiner

*Primary Examiner* — Yonel Beaulieu
(74) *Attorney, Agent, or Firm* — Miller Canfield

(57) ABSTRACT

A sickle cutting system is mounted on a header for forward travel over ground having a standing crop thereon and includes a cutter bar with a plurality of knife guards and two sickle bars driven at a phase angle difference where the drive system has a phase difference control component operable to drive the first and second sickle bars at a first phase angle difference typically at or around 180 degrees difference to minimize vibration when no cutting action is occurring and at a second phase angle difference which can be at or around 90 degrees to minimize variations in loading applied to the drive system when the cutting action is taking place.

18 Claims, 7 Drawing Sheets

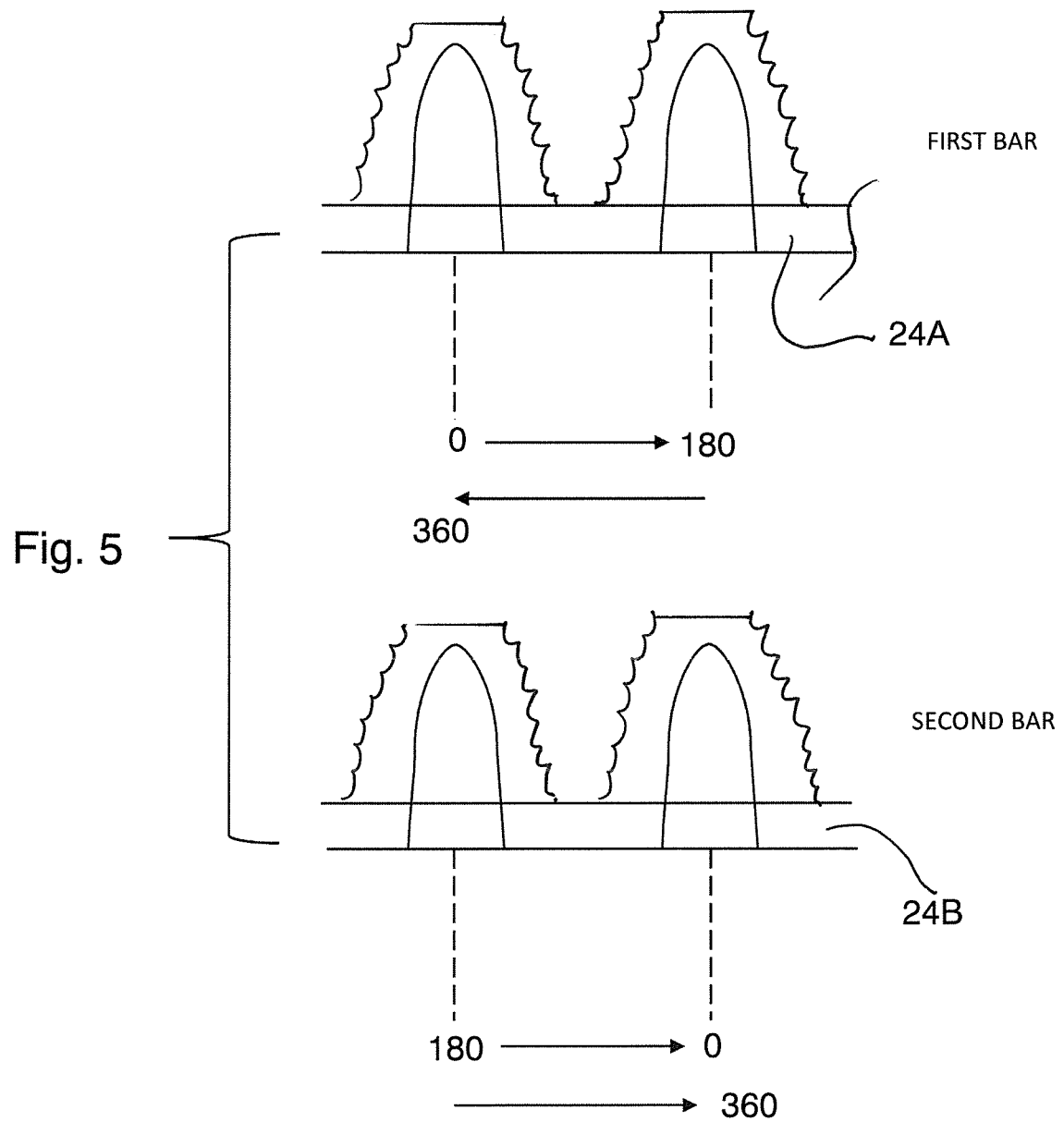

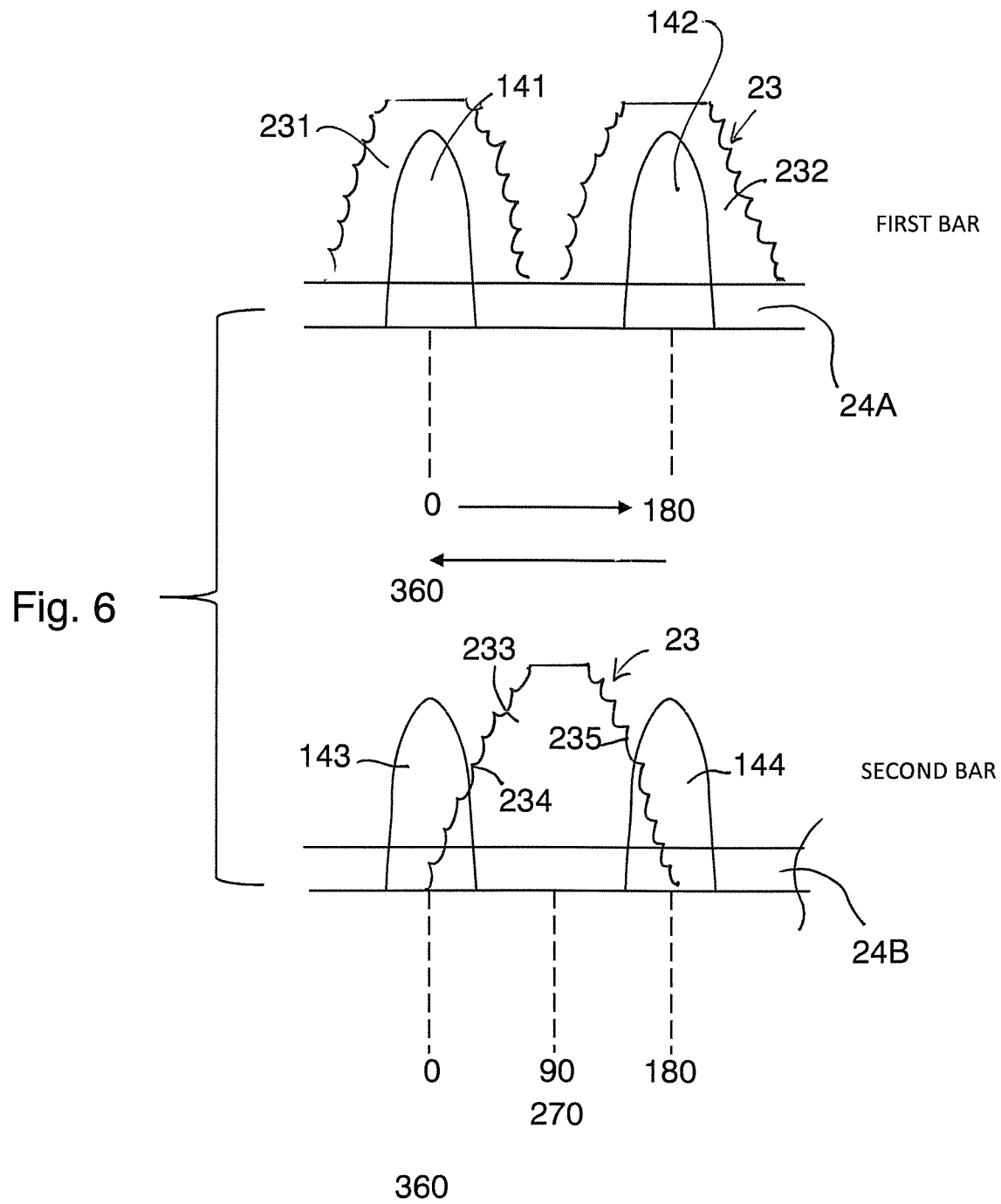

DUAL SICKLE KNIFE DRIVE WITH VARIABLE PHASE ANGLE

This invention relates to a knife drive for split or dual sickle bars for use on harvester headers, such as combines, swathers, mower-conditioners and similar crop and hay cutters and particularly to an arrangement in which the phase angle difference between the two sickle bars can be varied for different conditions.

BACKGROUND OF THE INVENTION

Where the cutter bar and sickle are long, in some arrangements, two sickle bar sections are provided end to end which are reciprocated independently. In some cases the two sickle bars are driven by independent drive systems where there is no control over the phase difference, so this varies over time with the sickle bars being in phase at some times and at some other changing phase difference at other times. Thus the movement of the sickle bars can generate undesirable vibration of the cutting system during the times where the two sickle bars are at or close to being in phase where the vibration is added.

In some arrangements a connection between the two drives is provided to keep the sickle bar movements as much as reasonably possible consistently at 180 degrees angle difference which acts to drive the two bars in opposite directions to subtract the vibration.

In the US Published Application 2017/0127611 published May 11, 2017 by the present applicants is disclosed a drive arrangement for split sickle bar sections which utilizes separate drives for each sickle bar and provides an arrangement for controlling the relative reciprocating movement of the sickle bars to maintain them at the set 180 degree angle difference. This is carried out by providing a plurality of markers on the movement so that, by continually counting the markers, the speed of drive of the sickle bars can be relatively increased or decreased to try to maintain the alignment of the markers.

SUMMARY OF THE INVENTION

It is one object of the present invention to provide a crop cutting apparatus including an arrangement for maintaining two sickle bars at a required phase angle difference.

According to the invention there is provided a crop cutting apparatus comprising:

a frame structure arranged for forward travel over ground having a standing crop thereon;

a cutter bar secured to the frame structure and extending transversely across a front end of said frame structure;

a plurality of knife guards mounted in spaced relation along said cutter bar and projecting forwardly therefrom;

each of said guards having a ledger surface with opposed side edges thereof arranged to provide first and second shearing edges;

a first and a second sickle bar mounted in transversely extending position and being driven for reciprocating movement relative to said knife guards;

the first and second sickle bars each having a plurality of knife blades mounted thereon for movement therewith with each of the knife blades having two side cutting edges which cooperate with said shearing edges of said knife guards;

a drive system driving the first sickle bar through repeated cycles of reciprocating movement and driving the second sickle bar through repeated cycles of reciprocating movement;

wherein the drive system is arranged such that the reciprocating movements of the first and second sickle bars occur at a phase angle difference;

the drive system having a phase difference control component operable to drive the first and second sickle bars at a first phase angle difference and at a second phase angle difference which is different from the first phase angle difference.

The term phase angle as used herein is directed to the description of the reciprocating movement which is typically but not necessarily sinusoidal. It will be appreciated that the knives have linear movement that there is no literal 'angle' change in the knife position, just in relation to the phase in the reciprocating movement.

This arrangement thus provides the concept of running the two knives in opposed phase or at 180 degrees phase angle difference while not cutting to reduce vibration out of phase but changing the phase angle difference to a different angle difference when cutting. The parameters to determine how much out of phase they are could be things such as ground speed, whether there is crop present or not. In other cases knife drive load or some other parameter that senses when the knife is running empty and therefore needs to be generally in opposed phase.

Preferably the first phase angle difference is in the range 160 to 200 degrees, preferably in the range 170 to 190 degrees and more preferably is of the order of 180 degrees and is employed when the sickle bars are not cutting crop. This is the time when vibration is at a maximum if the two sickle bars are not maintained accurately at the opposed phase condition.

That is preferably there is provided a control arrangement operable to automatically select the first phase angle difference when conditions of the crop cutting apparatus indicate that no crop is being cut. This can include a sensor responsive to the presence and absence of crop to be cut. This could be mechanical or could be an image analysis system looking at the cutting action.

For example, the control apparatus can include a sensor responsive to an increase of cutting load on the drive system indicative of crop being cut.

As another example the control apparatus can be operable to select the first phase angle when the apparatus is stationary and/or the cutter bar raised, both of which conditions are applicable to indicate that no cutting is occurring.

It is also possible in this arrangement that the second phase angle difference is itself variable between two or more different angles or an infinitely variable adjustment, such as for example the second phase angle difference can vary in response to changes in ground speed or proportional to ground speed or drive load or to some other detectable condition in the cutting system.

In some cases the second phase angle difference can be 0 degrees where the sickle bars are actually in phase. However more typically the second phase angle difference is in the range 70 to 110 degrees, preferably in the range 80 to 100 degrees and more preferably is of the order of 90 degrees and is employed when the sickle bars are cutting crop. If the system includes a center knife drive system driven by one motor, it may be possible to adjust the timing between the two knives by a small amount by changing gear ratios. It may be difficult to change it by 90 degrees. Thus the phase angle difference selected during cutting is not limited to any particular angle except that it is different from the out of phase condition selected during non-cutting.

In many cases the drive system comprises a hydraulic circuit including one or more hydraulic motors supplied by one or more pumps and the sensed load to the drive system is detected by changes in the hydraulic circuit such as pressure changes or flow to the pump.

The second phase angle difference is typically employed when the sickle bars are cutting crop and is arranged at a phase angle difference such that, when the first sickle bar is at an angle in the cycle where no cutting is occurring due to the location of the sickle blades relative to the guards, the second sickle bar is at an angle in the cycle where cutting is occurring between one of the two side cutting edges of the blades as they cooperate with said shearing edges of said knife guards, and vice versa. This can be used in a system where the first sickle bar has minimum cutting forces applied when the second sickle bar has maximum cutting forces applied and vice versa so as to smooth changes in loading applied to the drive system.

It will be appreciated therefore that the main concern when no cutting is occurring is to minimize the vibration from the cutting system which can be quite unpleasant to the operator and potentially damaging to the machine. However when cutting is occurring, the vibration is automatically dampened by the presence of the crop so that other conditions such as loading to the drive system and efficiency of cutting become more important to supersede the vibration problem.

In one arrangement by which the phase angle can be controlled the drive system includes a first drive component for the first sickle bar and a second component for the second sickle bar and wherein each of the first and second drive components includes a sensing system which generates a plurality of sensor signals for each cycle of reciprocating movement and wherein the phase difference control component is responsive to the sensor signals from both of the first and second drive systems for advancing or retarding one of the first and second drive components. In this construction typically the phase difference control component is arranged to count the sensor signals and the sensing system comprises a plurality of markers which are arranged to pass a stationary sensor so as tc generate a sensing signal for each passing marker.

In order to change the phase angle difference, in one arrangement the first and second drive system each comprise a respective one of first and second hydraulic motors connected in series, with fluid under pressure being directed from a source of hydraulic fluid under pressure to the first motor, from the first motor to the second motor and from the second motor to drain and the control device comprises a first valve operable to discharge some fluid passing from the source to the first hydraulic motor to the second motor to advance the second motor and a second valve operable to discharge some fluid passing from the first hydraulic motor to the second motor to drain to retard the second motor.

In another arrangement a common drive system can include a first drive component for the first sickle bar and a second component for the second sickle bar and a drive connection such as a mechanical link or gear drive coupling the first and second drive components and the drive connection is operable to change the phase angle differences.

In order to carry out the above step to maintain the number of signals substantially equal at the selected phase angle difference, preferably the control device is arranged to count the sensor signals and to repeatedly compare the numbers that counted. In the event that a discrepancy in the numbers counted is identified, the control device is arranged to advance or retard said one of the first and second drive systems. Preferably the comparison is carried out within a period of less than one cycle. Typically the comparison is carried out repeatedly or over a number of times per cycle. In this way the system can determine whether the required phase angle is maintained a number of times per cycle and it can carry out corrective measures as soon as the discrepancy is detected.

The counting of the pulses can be in effect continuous so as to detect a soon as a discrepancy in count value occurs. As an alternative, the counting may be carried out in specific sequential time periods so that the system takes action only at the end of the specific time period and only in the event that a discrepancy is detected within that time period. When it is required to change the phase angle difference, the same counting can be used to temporarily change the number of pulses counted by one drive system until its phase angle is modified by the required angle.

In the system of the present invention, preferably each of the first and second drive systems includes a rotary member and wherein the sensing system is arranged to generate the sensor signals at spaced positions around the rotary member. In an arrangement where the drive system drive system includes a gearwheel, the sensing system can include a sensor which detects the passage of a tooth of the gearwheel. Sensing system can be operated by proximity detection or by blockage of light path or any other suitable sensing systems. In an arrangement where the drive system does not include a suitable gearwheel, typically such drive systems include a flywheel where markers on the flywheel can be detected. One simple example can be provided by holes in the flywheel allowing passage of a light beam which can be detected. Typically the system uses a proximity sensor that senses the presence/absence of teeth/markers.

Thus preferably the sensing system comprises a plurality of markers which are arranged to pass a stationary sensor so as to generate a sensing signal for each passing marker. However individual markers each providing a signal can be mounted on the rotary member.

Preferably within an angle of 360 of a cycle, the sensor signals are equiangularly spaced. That is, where a rotary member carries the markers, they are equidistantly spaced around the member. However additional markers may be provided or markers may be omitted at particular positions. The markers can also be provided on the sickle bar itself or another part of the drive system which reciprocates.

Preferably the control device includes an arrangement for inputting once, for use in a plurality of cycles, data indicating for each of the first and a second sickle bars a specific angle or position of the sickle bar in the cycle relative to the markers associated with that sickle bar. That is a system is preferably provided to initiate the counting of the markers at a position where it is known that the sickle bars are in phase. The continued operation however does not utilize any marker or component indicative of synchronization but instead maintains the in phase position by the counting of the markers of the two sickle bars.

In particular, preferably, the arrangement for inputting data inputs data provides the initialization data when the first and second sickle bars are in opposed phase. However it will be appreciated that it is only necessary to provide an initialization process so that counting can be carried out to obtain and to maintain this initial position.

In one preferred example the arrangement for inputting data is arranged to operate at a start-up of the first and a second sickle bars. That is an arrangement can be used in which the sickle bars are initially set on start up at a predetermined position, which may be in synchronized relationship or not. In an arrangement in which the sickle bars are halted on shut down at a predetermined known position, this position can be used as the initialization signal for the counting process on start up.

That is the arrangement for inputting data comprises a component of the sensing system which generates a sensor signal indicative of a predetermined location of the first and a second sickle bars in their cycles.

In an arrangement where the first and second drive system each comprise a respective one of first and second hydraulic motors connected in series, with fluid under pressure being directed from a source of hydraulic fluid under pressure to the first motor, from the first motor to the second motor and from the second motor to drain, the control device preferably comprises a first valve operable to discharge some fluid passing from the source to the first hydraulic motor to the second motor to advance the second motor and a second valve operable to discharge some fluid passing from the first hydraulic motor to the second motor to drain to retard the second motor.

Alternatively the control device can comprise a single valve operable to discharge some fluid passing from the source to the first hydraulic motor to the second motor to advance the second motor, as this is a more simple, less expensive arrangement.

BRIEF DESCRIPTION OF THE DRAWINGS

One embodiment of the invention will now be described in conjunction with the accompanying drawings in which:

FIG. 5 and FIG. 6 are schematic illustrations of the different phases of the two sickle bars.

In the drawings like characters of reference indicate corresponding parts in the different figures.

DETAILED DESCRIPTION

Figure 1:
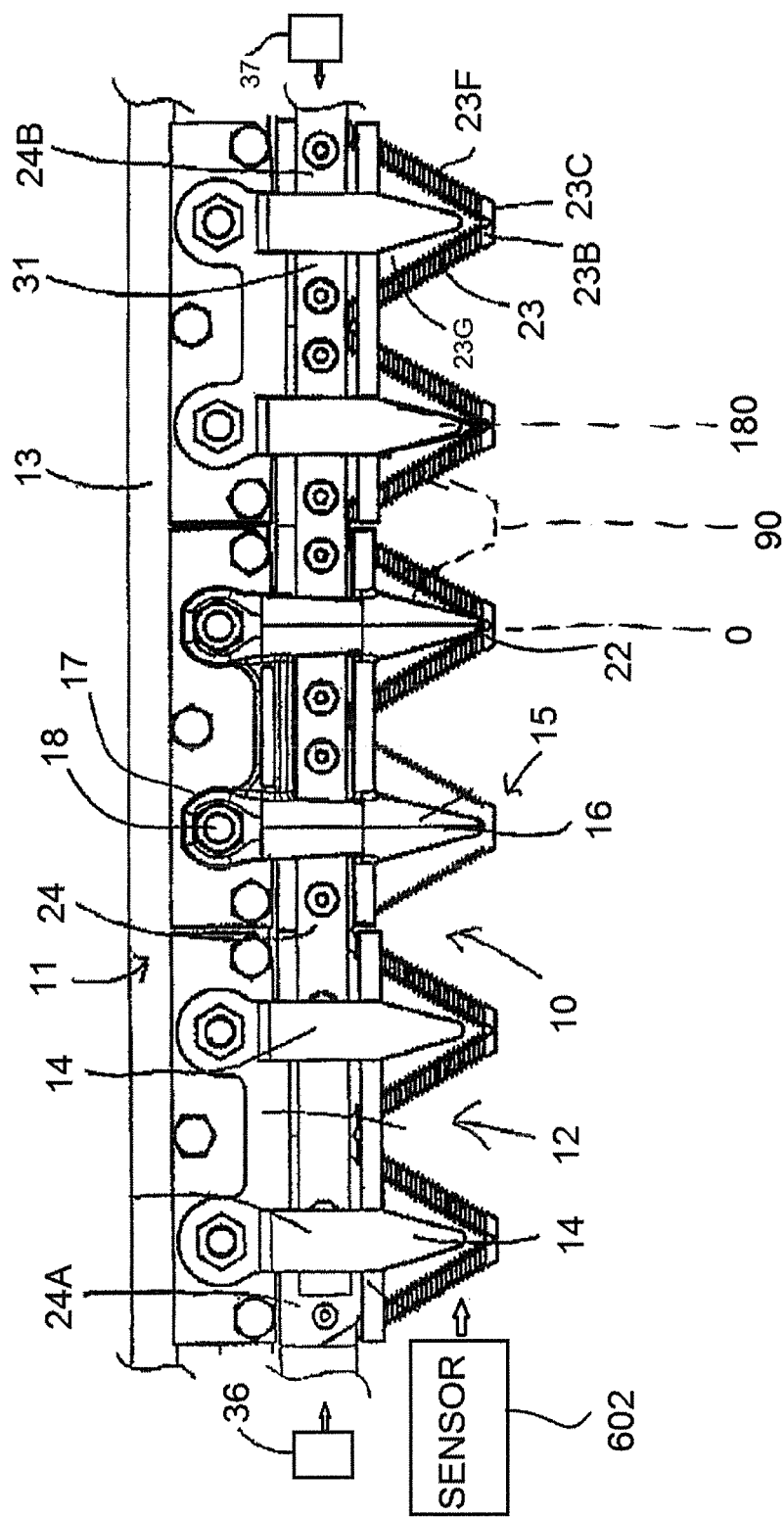
FIG. 1 is a plan view of a first embodiment of cutting apparatus according to the present invention showing a part only of the cutter bar and the knife guards with the two reciprocating sickle bars driven by two separate hydraulic motors.

In FIG. 1 is shown a first embodiment of a crop cutting apparatus generally indicated at 10. Only a part of the complete machine is shown since the remainder of the machine may vary widely depending upon requirements and since the construction is of course well known to a person skilled in the art. In this embodiment as shown, there is a frame generally indicated at 11 which of course forms only one part of the total frame structure that is the part of the frame that is relevant to the present invention.

The cutting device 10 further includes a cutter bar 12 attached to the frame structure 11. Thus the frame structure 11 in the part as shown comprises a guard bar 13 to which is attached a plurality of knife guards 14. The guard bar 13 is attached to a cutter bar 15 along the front edge of a frame structure which supports the guard bar in fixed position across the front edge of the frame for a cutting action of the crop cutting device on the standing crop.

The knife guards 14 are arranged in pairs and mounted on the guard bar 13 at spaced positions along the length of the guard bar. In the embodiment as shown, only three of the pairs of guards are shown but it will be appreciated that there are additional guards as required to provide a crop cutting apparatus of a required width.

The knife guards are basically of a conventional construction in that each includes a lower portion 15 and an upper portion 16. These two portions are mounted on the guard bar 13 by a mounting arrangement 17 including bolts 18.

In the embodiment shown the guards are stub guards so that the nose of the upper and lower portions substantially overlie one another and confine between them the blades 23 of the sickle bar 24. However the same arrangement can use pointed guards.

In the embodiment shown there are two sickle bars including a first sickle bar 24A and a second sickle bar 24B. The bar 24A is driven by a reciprocating drive motor 36 and symmetrically the bar 24B is driven by reciprocating drive motor 37. These drive motors are arranged at opposite ends of the sickle bar so that the sickle bars meet at a central guard generally indicated at 30. Each of the sickle bars is driven by the reciprocating drive motor such that the bar reciprocates by a distance equal to the space between each of the guards along the guard bar 13. The reciprocating drive can also drive the sickle bars by distance equal to the space between three or even four of the guards so that the blades travel a greater distance than between two of the guards.

Each sickle bar comprises a support bar member 31 and the plurality of blades indicated at 23. Each of the blades forms a generally triangular-shaped member which has a rear end bolted to the bar and converges from the rear end to a front end 23B. Each of the blades has a side edge 23F and a second side edge 23G. The sides edges are chamfered from the top surface down to the bottom surface 23E so that a sharp edge is formed at the bottom surface at each of the side edges.

Figure 2:
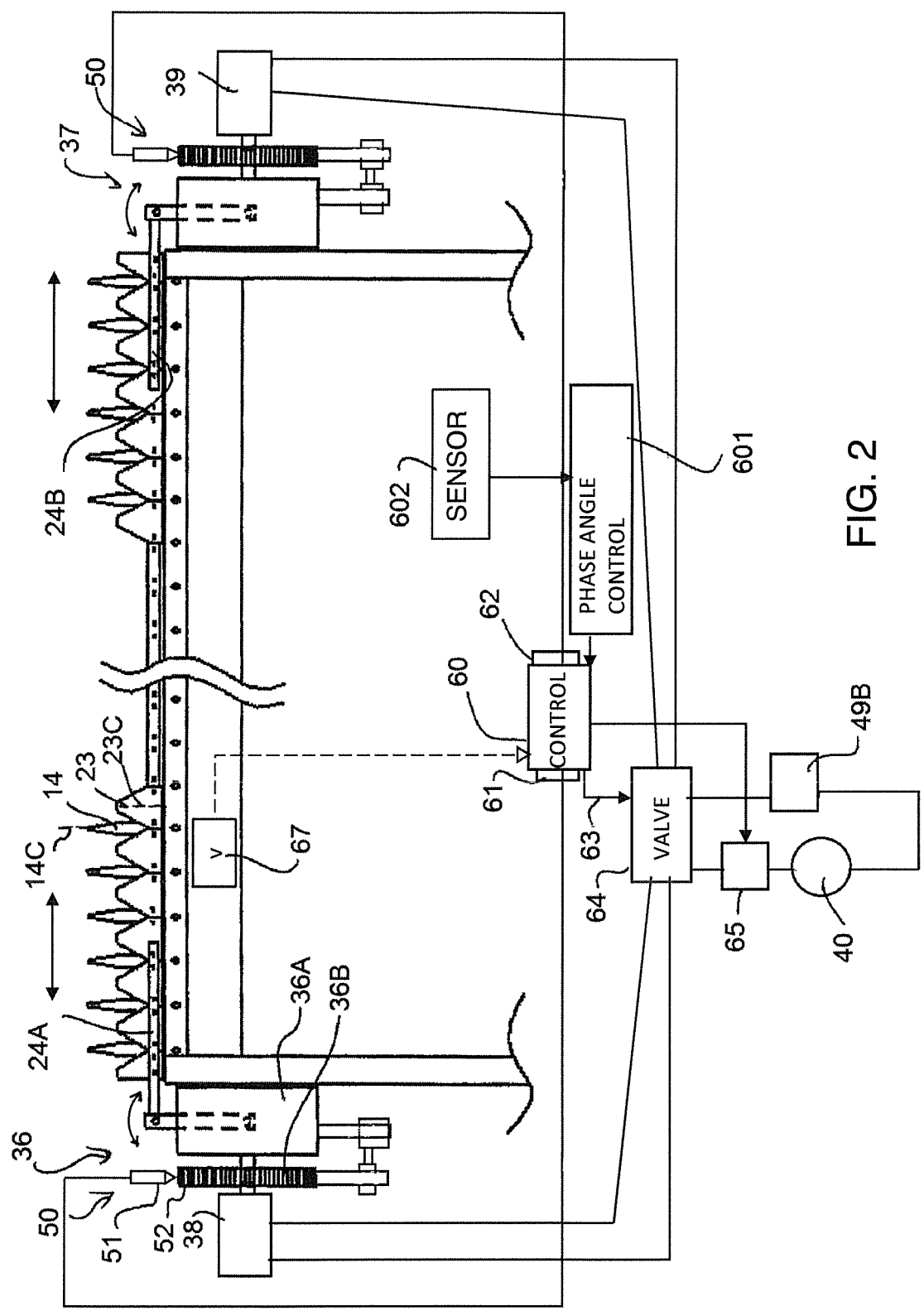
FIG. 2 is a schematic illustration of the cutting apparatus of FIG. 1 showing the sickle bar synchronization system and using a first sensing system on a timing belt drive.

The top member 16 acts to hold the blades downwardly into engagement with the top surface of the bottom portion 15. The bottom portion 15 has two side edges as best shown in FIG. 2 with those side edges 15A and 15B acting as side edges of a ledger surface 15C defined across the top of the bottom portion 15. Thus the cutting action of the blades occurs between the ledger 15C and the bottom surface of the blade as the blade reciprocates from its position at one of the guards to its position at the next adjacent one of the guards. In this cutting action, therefore, the side edge of the blade moves across the space between the guards and enters onto the ledger surface of the guard in a cutting action between the bottom surface of the blade and the top surface of the guard which are immediately adjacent and either in contact or closely adjacent position to provide a shearing action on the crop.

In these conventional guards, the upper portion 16 acts merely as a hold down member contacting the upper surface of each of the blades so as to apply pressure to that upper surface and hold it in contact with or closely adjacent the ledge surface of the bottom portion where the cutting action occurs. The upper portion therefore as shown in FIG. 2 has side surfaces 16A and 16B which are narrower than the side edges of the bottom portion 15.

This construction is well known and widely used in sickle knife cutting systems of this type.

The individual sickle bars 24A and 24B are driven by reciprocating drives 36 and 37, respectively. Such drives can be of any desired type that converts a rotary input motion into a linear motion for reciprocating the sickle bar sections individually. The rotary input to the drives 36 and 37 is provided in the present disclosure by hydraulic motors 38 and 39.

Figure 4:
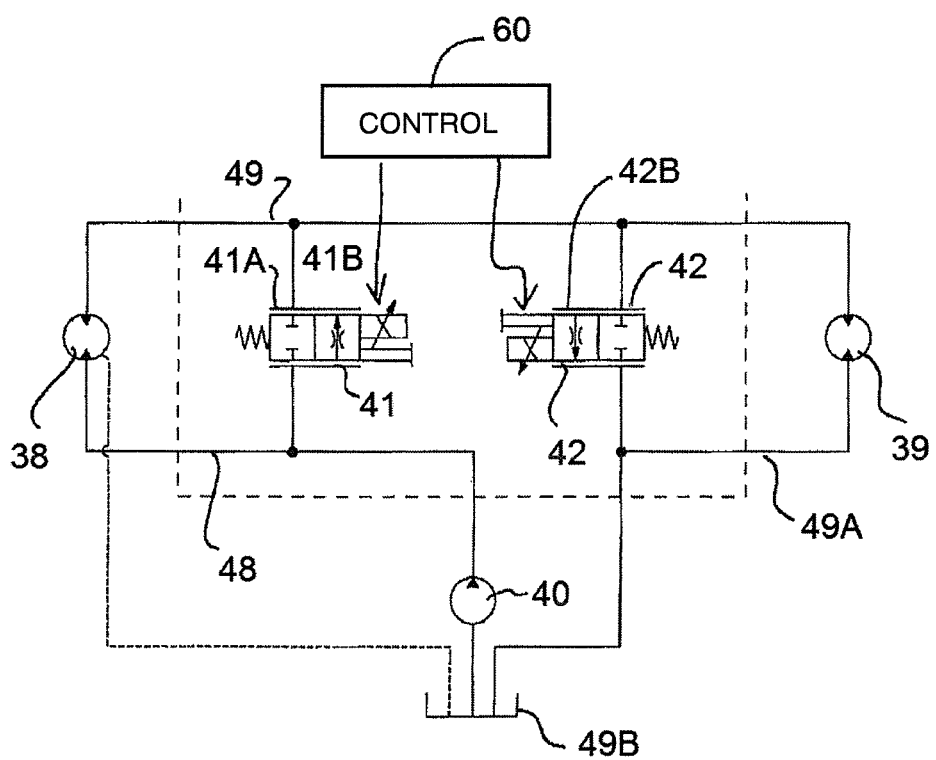
FIG. 4 is a schematic illustration of a first valve arrangement for the control device of FIG. 2.

A first or master hydraulic motor 38 is used for driving the rotary input to the drive 36, a second or slave hydraulic motor 39 is used for driving the rotary input to the drive 37. The two motors, 38 and 39 are shown in FIG. 4 connected in series. The sickle bar sections are driven to move in opposite directions, and they will reciprocate with the inner ends of the sickle bar sections (near the center of the header) moving toward each other and then away from each other as the drive cycles. The sickle bar sections may overlap for about a foot of length, when both sickle bar sections are at the ends of their inward (toward center) strokes, with the sickle knives on the sickle bar sections spaced 3 inches on center, with a 3 or 6 inch stroke.

As described above, therefore, the arrangement provides first and second sickle bars 24A, 24B mounted in transversely extending position across the cutter bar and driven in opposed reciprocating movement across the knife guards at the same frequency but in opposed phase. Each of the sickle bars carries the knife blades thereon which provide side cutting edges cooperating with the edges of the knife guards.

Each of the drive systems 36 and 37 are shown in FIG. 2 include a device 36A for converting rotary movement from a rotary drive wheel 36B into the required reciprocating movement. The drive wheel 36B is driven by the hydraulic master motor 38. On the right-hand side of the system the drive 37 is driven by the slave motor 39.

The drive systems first drive each of the first and second sickle bars through repeated cycles of reciprocating movement back and forth between the guards. Each cycle of movement extends from one end position of a stroke up to unopposed end position of the stroke and back to the first and position. This movement is generated by a single rotation of the drive wheel 36B and the location on the drive wheel 36B can have any associated position in the cycle of the reciprocating movement of the sickle bar.

Each of the drive systems includes a sensing system generally indicated at 50 which is arranged to generate a plurality of sensor signals for each cycle of the reciprocating movement and thus for each rotation of the drive wheel.

In FIG. 2 the drive wheel forms part of a timing belt drive where the wheel includes drive teeth at spaced positions around the periphery of the wheel. In this arrangement the sensor system 50 includes a single sensing device 51 which cooperates with the teeth 52 of the wheel 36B. The sensing system can use a light beam broken by the movement of the teeth or a proximity sensing system which detects the presence of the teeth. Regardless of the system used, the sensing system generates pulses which are transmitted to a control 60 as a stream of pulses which can be detected in the control device 60 and can be counted. Thus the control device includes a counting system 61 for the pulses from the left hand drive 36 and a counting system 62 for the pulses from the right hand drive 37.

The control device 60 is arranged to be responsive to the sensor signals as counted by the counters that 61 and 62 to provide an output 63 to a valve arrangement 64 to control the flow of fluid moving the motors 38 and 39. In this way the control device 60 operates to count the number of pulses received and to operate the valve arrangement 64 so as to continuously maintain the number of pulses counted approximately or substantially equal.

As shown in FIG. 4, the pump 40 supplies fluid through the line 48 to the master motor 38 driving the drive system 36. From the master motor 38, the fluid passes through a line 49 to the slave motor 39. From the slave motor 39 the fluid passes through a line 49A to a drain 49B. The valve assembly 64 includes two valves 41 and 42. The valve 41 is connected across the lines 48 and 49 so it can be operated under control of the control device 60 from a closed position 41A to an open position 41B. In the closed position no fluid transferred from the line 48 to the line 49. In the open position fluid passes from the line 48 to the line 49 and thus bypasses the master motor 38. This fluid which bypasses the master motor acts to advance the slave motor and retard the master motor since the system acts to transfer fluid away from the master motor and to the slave motor by a certain distance of rotation relative to the master motor. The valve 42 includes a closed position 42A and an open position 42B. In the open position a volume of fluid is discharged from the line 49 to the line 49A and thus to the drain. This amount of fluid discharged from the line 49 acts to bypass the slave motor 39 and thus to retard the slave motor by a certain distance of rotation relative to the master motor. In this way the control 60 can operate the valves 41 and 42 to advance and retard the position of the slave motor relative to the master motor.

The valves 41 and 42 are preferably PWM valves which means that they can precisely control the flow through the valves from near zero minimum to the maximum displacement of the valve which is typically around 4 gallons per minute. The amount of fluid that is allowed through the valve is fully controlled by the output of the controller and depends on an algorithm based on how many teeth the two drives are out of synchronization and other factors in a PID control loop. Thus the valves are not merely "open" or "closed" and valve 41 will nearly always be allowing a certain amount of flow equal to the leakage of the master motor to bypass to the second motor. It will be appreciated that all such motors have a slight leakage so that necessarily, in most cases, some fluid is leaked through the master motor so that we slave motor typically runs more slowly.

In operation therefore the control system acts to count the number of pulses arriving from the drive 36 and to compare this number of pulses with the pulses arriving from the drive 37. In the event that the comparison remains equal, no action is required since the two drive systems remain in phase. In the event that the number of pulses from the counter 62 is greater or less than the number of pulses from the counter 61, the control device acts to operate the valves 41 and 42 to advance or retard the slave motor position relative to the master motor position. The counting of the pulses can be in effect continuous so as to detect a soon as a discrepancy in count value occurs. As an alternative, the counting may be carried out in specific sequential time periods so that the system takes action only at the end of the specific time period and only in the event that a discrepancy is detected within that time period.

The control device is arranged to effect the comparison repeatedly during each cycle. Thus in one example the number of teeth on the drive wheel may be of the order of 48 so that there are 48 pulses for each rotation of the drive wheel and each cycle of the sickle bar. This allows the comparison to be effected repeatedly during each cycle so that the correction of the positions of the motors can also be carried out repeatedly each cycle.

It will be appreciated that each tooth of the drive wheel is in effect identical to each of the others so that the pulse generated is the same as the other pulses and has no direct relation to any position of the sickle bar in its cycle. Instead of indicating a particular position, therefore, the system operates to count the pulses so as to repeatedly take steps to maintain the number of pulses equal.

As shown in FIG. 1, the drive system provided by the motors 36 and 37 is arranged such that the reciprocating movements of the first and second sickle bars 24A, 24B occur at a phase angle difference. That is the blades on the bar 24A reciprocate at a different time from those on the bar 24B.

Thus the control 60 in FIG. 2, the drive system includes a phase difference control component 601 operable to drive the first and second sickle bars at a first phase angle difference and at a second phase angle difference which is different from the first phase angle difference. The component 601 is operated in response to a sensor 602 which detects whether or not the cutter bar is actually cutting crop. The sensor 602 can be provided by an image analysis system or by a mechanical contact component.

Thus depending on whether or not cutting is taking place, the component 601 operates the control 60 to select either a first phase angle difference shown in FIG. 5 where the first and second bars are driven at approximately 180 degrees phase difference or a second phase angle difference shown in FIG. 6 where the first and second bars are driven at approximately 90 degrees phase difference.

While the first phase difference is preferably approximately 180 degrees, the first phase angle difference can be in the range 160 to 200 degrees, or in the range 170 to 190 degrees and is employed when the sickle bars are not cutting crop so as to keep the bars substantially directly out of phase so that the vibration is balanced between the two bars significantly reducing the vibration of the cutting system.

The sensor 602 and control 601 are operable to select the first phase angle difference when conditions of the crop cutting apparatus indicate that no crop is being cut.

The sensor 602 can be of a type which detects when the apparatus is stationary and/or the cutter bar raised.

Figure 3:
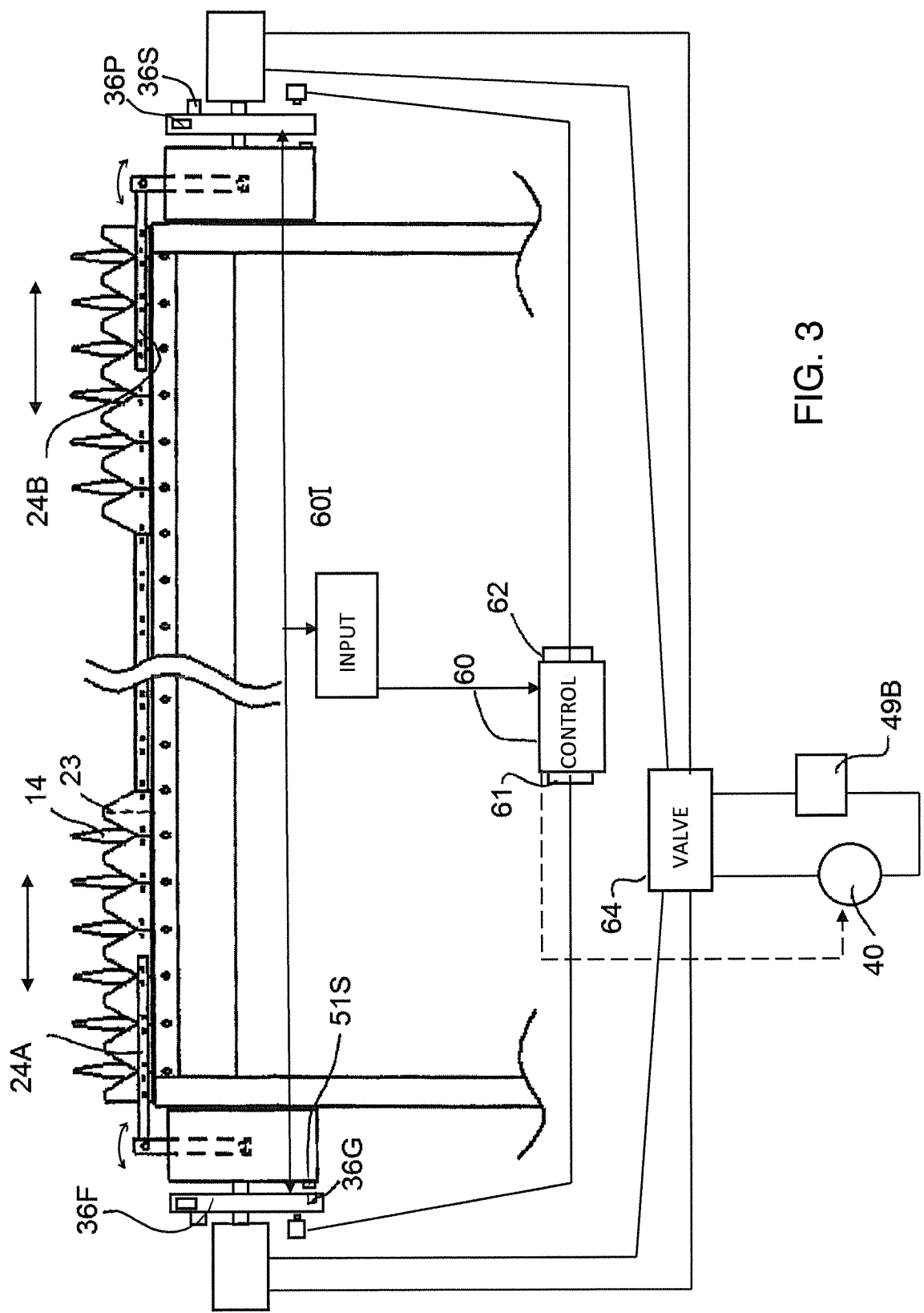
FIG. 3 is a similar schematic illustration to that of FIG. 2 showing a sensing system with a flywheel.

As described above and shown in FIGS. 2 and 3, the drive system can include the first drive component 36 for the first sickle bar 24A and a second component 37 for the second sickle bar 24B. Each of the first and second drive components 36, 37 includes the sensing system 50 which generates a plurality of sensor signals for each cycle of reciprocating movement and the phase difference control component 601 and the control 60 cooperate responsive to the sensor signals from both of the first and second drive systems for advancing or retarding one of the first and second drive components 36, 37.

Figure 1A:
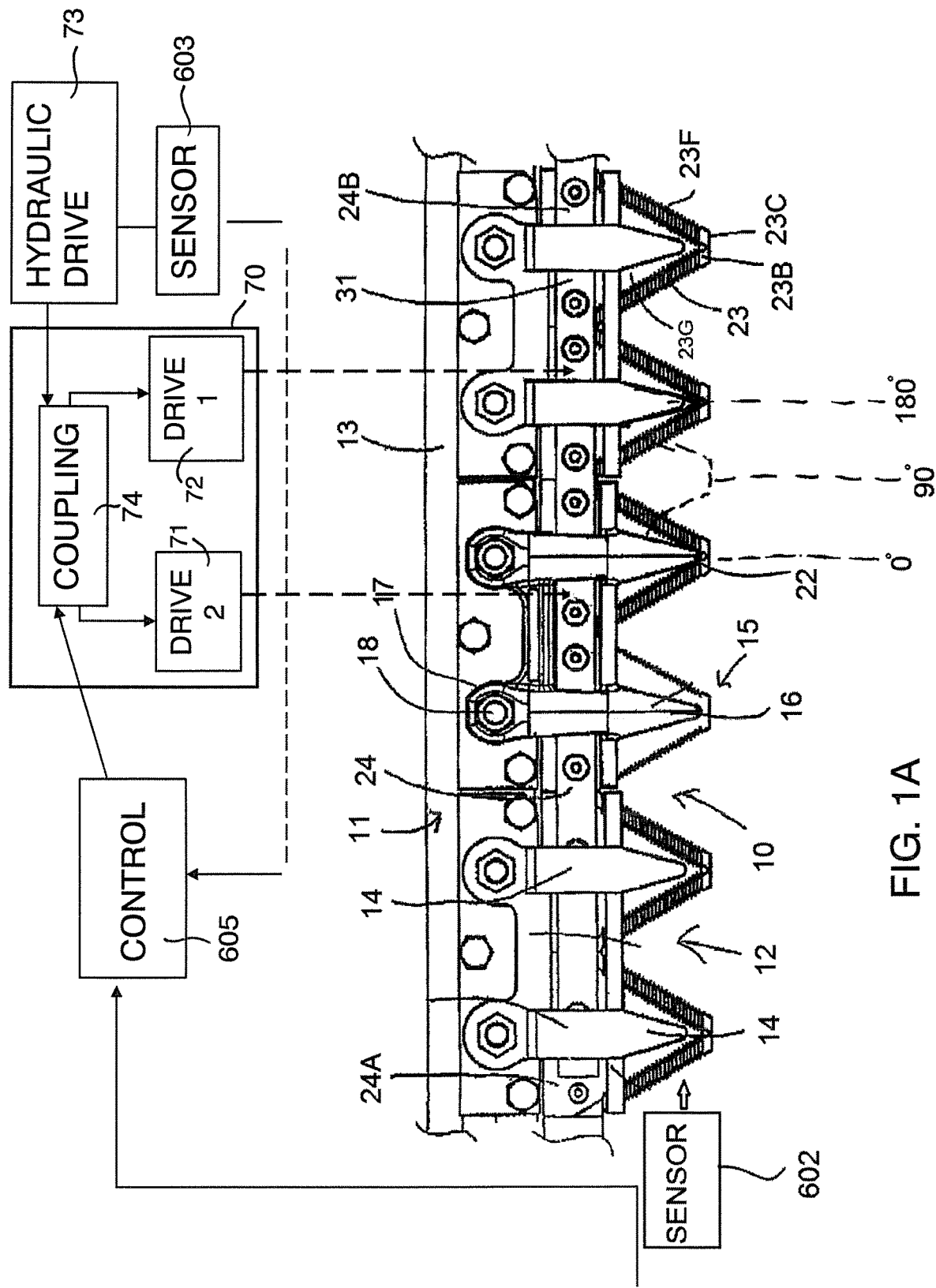
FIG. 1A is a plan view of a second embodiment of cutting apparatus according to the present invention showing a part only of the cutter bar and the knife guards with the two reciprocating sickle bars driven by a common assembly.

As shown in the alternative arrangement of FIG. 1A, the drive system can be a central common drive system 70 which includes a first drive component 71 for the first sickle bar 24A and a second component 72 for the second sickle bar 24B. The common drive system is driven from a common hydraulic motor 73 to commonly drive the bars through the components 71 and 72. A coupling or drive connection 74 connects the first and second drive components 71 and 72 in a manner which allows the drives 1 and 2 to remain in synchronism at the same drive rate but at variable phase differences selected by the coupling 74 in response to a control system 605. That is the drive connection is operable by the control 605 to change the phase angle differences between the two drives 71, 72 and to maintain the drives at the same frequency at the set phase difference. The drive connection can comprise a mechanical link to maintain the same frequency as set by the drive 73. The coupling 74 can also be arranged such that the second phase angle difference is variable rather than a single angle such as the 90 degrees described above. The control 605 which sets the phase angle difference can also be dependent on other measured parameters such as changes in ground speed or changes in sensed load applied to the drive system by the first and second sickle bars.

As another arrangement, the selection of the first and second phase angles can be operated by the control apparatus 605 which includes a sensor 603 responsive to an increase of cutting load on the drive system indicative of crop being cut as detected at the drive 73.

That is the drive system comprises a hydraulic circuit including hydraulic motors supplied by one of more pumps within the drive 73 and the sensed load to the drive system is detected by changes in the hydraulic circuit.

As shown in FIG. 6, the cycles of the two sickle bars pass in the reciprocating action from zero degrees when the blade 23 at position 231 is aligned with one guard 141 through 180 degrees when the blade 23 at position 232 at guard 142 and back to the position 231 at 360 degrees.

Symmetrically the second bar 24B includes a blade 23 which also reciprocates back and forth between the guards 143 and 144. As set forth above, the second phase angle difference is employed when the sickle bars are cutting crop.

It will be appreciated that cutting of the crop occurs not through the whole 360 degree cycle but at certain stages in the cycle where the side edges 234 and 235 of the blades are in shearing action with the side edges of the guards.

In this situation as shown in FIG. 6, the phase angle difference between the bars 24A and 24B is approximately 90 degrees and arranged such that, when the first sickle bar 24A is located at an angle of zero in the cycle, where no cutting is occurring due to the location of the sickle blades relative to the guards, the second sickle bar is at the angle of approximately 90 degrees in the cycle where cutting is occurring between one of the two side cutting edges 234 and 235 of the blades as they cooperate with said shearing edges of said knife guards.

The same situation occurs at the angle of 270 degrees of the bar 24B when the bar 24A is at 180 degrees.

Symmetrically the bar 24A carries out its cutting action at or around the 90 and 270 degree locations when the bar 24B is not cutting at angles 180 and 260.

In this way, the second phase angle difference is arranged such that the first sickle bar has minimum cutting forces applied when the second sickle bar has maximum cutting forces applied and vice versa so as to smooth changes in loading applied to the drive system 73 by the cutting action.

The selection of the second phase angle difference can be made depending on many parameters with the intention of providing the best cutting action independent of vibration issues. Thus the angle can be selected based on the specific angle at which maximum cutting action occurs which depends on the geometry of the cutting system. The angle can be selected upon the type or conditions of the crop which an alter cutting forces. The angle can be selected based on ground speed and/or cutter bar speed. The angle can be selected empirically by detecting the effect on the cut crop while varying the angle trough a specific range.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A crop cutting apparatus comprising:
a frame structure arranged for forward travel over ground having a standing crop thereon;
a cutter bar secured to the frame structure and extending transversely across a front end of said frame structure;
a plurality of knife guards mounted in spaced relation along said cutter bar and projecting forwardly therefrom;
each of said guards having a ledger surface with opposed side edges thereof arranged to provide first and second shearing edges;
a first and a second sickle bar mounted in transversely extending position and being driven for reciprocating movement relative to said knife guards;
the first and second sickle bars each having a plurality of knife blades mounted thereon for movement therewith with each of the knife blades having two side cutting edges which cooperate with said shearing edges of said knife guards;
a drive system driving the first sickle bar through repeated cycles of reciprocating movement and driving the second sickle bar through repeated cycles of reciprocating movement;
wherein the drive system is arranged such that the reciprocating movements of the first and second sickle bars occur at a phase angle difference;
the drive system having a phase difference control component operable to change the phase angle difference between the first and second sickle bars from a first phase angle difference to a second phase angle difference which is different from the first phase angle difference.

2. The crop cutting apparatus according to claim 1 wherein the first phase angle difference is in the range of 160 to 200 degrees—and is employed when the sickle bars are not cutting crop.

3. The crop cutting apparatus according to claim 2 wherein there is provided a control arrangement operable to select the first phase angle difference when conditions of the crop cutting apparatus indicate that no crop is being cut.

4. The crop cutting apparatus according to claim 2 wherein the control apparatus includes a sensor responsive to the presence and absence of crop to be cut.

5. The crop cutting apparatus according to claim 2 wherein the control apparatus includes a sensor responsive to an increase of cutting load on the drive system indicative of crop being cut.

6. The crop cutting apparatus according to claim 2 wherein the control apparatus is operable to select the first phase angle when the apparatus is stationary and/or the cutter bar raised.

7. The crop cutting apparatus according to claim 1 wherein the second phase angle difference is variable.

8. The crop cutting apparatus according to claim 1 wherein the second phase angle difference is in the range 70 to 110 degrees and is employed when the sickle bars are cutting crop.

9. The crop cutting apparatus according to claim 1 wherein the second phase angle difference is variable in response to changes in ground speed or in response to a sensed load applied to the drive system by the first and second sickle bars.

10. The crop cutting apparatus according to claim 9 wherein the drive system comprises a hydraulic circuit including hydraulic motors supplied by one of more pumps and the sensed load to the drive system is detected by changes in the hydraulic circuit.

11. The crop cutting apparatus according to claim 1 wherein the second phase angle difference is employed when the sickle bars are cutting crop and is arranged at a phase angle difference such that, when the first sickle bar is at an angle in the cycle where no cutting is occurring due to the location of the sickle blades relative to the guards, the second sickle bar is at an angle in the cycle where cutting is occurring between one of the two side cutting edges of the blades as they cooperate with said shearing edges of said knife guards, and vice versa.

12. The crop cutting apparatus according to claim 11 wherein the second phase angle difference is arranged such that the first sickle bar has minimum cutting forces applied when the second sickle bar has maximum cutting forces applied and vice versa so as to smooth changes in loading applied to the drive system.

13. The crop cutting apparatus according to claim 1 wherein the drive system includes a first drive component for the first sickle bar and a second component for the second sickle bar and wherein each of the first and second drive components includes a sensing system which generates a plurality of sensor signals for each cycle of reciprocating movement and wherein the phase difference control component is responsive to the sensor signals from both of the first and second drive systems for advancing or retarding one of the first and second drive components.

14. The crop cutting apparatus according to claim 13 wherein the phase difference control component is arranged to count the sensor signals.

15. The crop cutting apparatus according to claim 13 wherein the sensing system comprises a plurality of markers which are arranged to pass a stationary sensor so as to generate a sensing signal for each passing marker.

16. The crop cutting apparatus according to claim 13 wherein the first and second drive system each comprise a respective one of first and second hydraulic motors connected in series, with fluid under pressure being directed from a source of hydraulic fluid under pressure to the first motor, from the first motor to the second motor and from the second motor to drain and wherein the control device comprises a first valve operable to discharge some fluid passing from the source to the first hydraulic motor to the second motor to advance the second motor and a second valve operable to discharge some fluid passing from the first hydraulic motor to the second motor to drain to retard the second motor.

17. The crop cutting apparatus according to claim 1 wherein the drive system includes a first drive component for the first sickle bar and a second component for the second sickle bar and a drive connection coupling the first and second drive components and wherein the drive connection is operable to change the phase angle differences.

18. The crop cutting apparatus according to claim 17 wherein the drive connection comprises a mechanical link.

* * * * *